United States Patent
Nisogi

(10) Patent No.: US 9,750,312 B2
(45) Date of Patent: Sep. 5, 2017

(54) FASTENER MEMBER

(71) Applicant: 3M INNOVATIVE PROPERTIES COMPANY, St. Paul, MN (US)

(72) Inventor: Shuhei Nisogi, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/433,863

(22) PCT Filed: Oct. 4, 2013

(86) PCT No.: PCT/US2013/063353
§ 371 (c)(1),
(2) Date: Apr. 7, 2015

(87) PCT Pub. No.: WO2014/058720
PCT Pub. Date: Apr. 17, 2014

(65) Prior Publication Data
US 2015/0289604 A1    Oct. 15, 2015

(30) Foreign Application Priority Data

Oct. 9, 2012    (JP) ................................ 2012-224383

(51) Int. Cl.
*A44B 18/00* (2006.01)
*F16B 2/22* (2006.01)

(52) U.S. Cl.
CPC ........ *A44B 18/008* (2013.01); *A44B 18/0065* (2013.01); *A44B 18/0069* (2013.01); *F16B 2/22* (2013.01); *Y10T 24/2708* (2015.01)

(58) Field of Classification Search
CPC . A44B 18/00; A44B 18/0019; A44B 18/0042; A44B 18/0046; A44B 18/0049;
(Continued)

(56) References Cited

U.S. PATENT DOCUMENTS 3,403,429 A    10/1968 Smith
4,842,916 A *  6/1989 Ogawa ............... A44B 18/0073
                                                           24/444
(Continued)

FOREIGN PATENT DOCUMENTS

JP    S61133943    6/1986
JP    S63-40607 U  3/1988
(Continued)

OTHER PUBLICATIONS

International Search Report for PCT International Application No. PCT/US2013/063353, mailed on Dec. 4, 2013, 6 pages.

*Primary Examiner* — Robert J Sandy
*Assistant Examiner* — Rowland Do
(74) *Attorney, Agent, or Firm* — Philip Y. Dahl; Harold C. Knecht, III

(57) ABSTRACT

A fastener member 10 is provided with a base portion 11 having a main surface 15, and a plurality of engaging members 12 provided upright on the main surface 15, in which mechanical coupling with a loop member 30 is achieved by causing the engaging members 12 to engage the loop member 30. The fastener member 10 is provided with an arm portion 13 disposed on the base portion 11 via a base connection portion 13a such that a tip side can pivot in a direction so as to approach the main surface 15, a claw portion 18 that is provided to the arm portion 13, and a hook-shaped protruding portion 14 provided to the base portion 11. The claw portion 18 and the hook-shaped protruding portion 14 latch onto one another when the fastener member 10 and the loop member 30 are coupled. The tip side of the arm portion 13 is positioned to a position opposite the main surface 15 away from the tips of the engaging portions 12 when the fastener member 10 and the loop member 30 are not coupled.

12 Claims, 5 Drawing Sheets

(58) Field of Classification Search
CPC ............ A44B 18/0065; A44B 18/0069; A44B 18/0073
USPC .................................................. 24/306, 442
See application file for complete search history.

(56) References Cited

U.S. PATENT DOCUMENTS

| | | | |
|---|---|---|---|
| 5,180,618 A * | 1/1993 | Kessler | A44B 18/0076 24/444 |
| 5,579,562 A | 12/1996 | Hattori et al. | |
| 6,307,708 B1 | 10/2001 | Yoda | |
| 6,851,161 B2 * | 2/2005 | Kingsford | A44B 18/0003 24/306 |
| 8,381,370 B2 * | 2/2013 | Higashinaka | 24/306 |
| 8,882,203 B2 | 11/2014 | Takehara et al. | |
| 2002/0181437 A1 | 12/2002 | Ohkubo | |
| 2007/0115914 A1 | 5/2007 | Ohkubo | |
| 2007/0124899 A1 * | 6/2007 | Israel | A44B 11/006 24/306 |

FOREIGN PATENT DOCUMENTS

| | | |
|---|---|---|
| JP | S63-167905 U | 11/1988 |
| JP | H04-263802 A | 9/1992 |
| JP | H08-112113 | 5/1996 |
| JP | H11329836 | 11/1999 |
| WO | WO 01/74676 | 10/2001 |

\* cited by examiner

FASTENER MEMBER

CROSS REFERENCE TO RELATED APPLICATIONS

This application is a national stage filing under 35 U.S.C. 371 of PCT/US2013/063353, filed Oct. 4, 2013, which claims priority to Japan Application No. 2012-224383, filed Oct. 9, 2012, the disclosures of which are incorporated by reference in their entireties herein.

FIELD OF THE INVENTION

The present invention relates to fasteners and in particular to a fastener member.

BACKGROUND

Conventionally, a fastener member provided with a base portion that has a surface and a plurality of engaging members that are provided in an upright manner to the surface, wherein the fastener member mechanically couples with a coupling target by engaging the engaging members to the coupling target. One example of this type of technology is disclosed in Japanese Unexamined Patent Application Publication No. H08-112113A, which describes a fastener member provided with protrusions that are provided in a substantially vertically upright protruding manner to roughly a center of a base portion. The fastener member described in Japanese Unexamined Patent Application Publication No. H08-112113A is such that the protrusions are inserted into holes in a target fastener member and thus positioned. When a predetermined amount of pressure is applied thereto in an approximating direction, structurally weak portions of the protrusions are destroyed, causing the protrusions to deform and become engaged to the target fastener member.

SUMMARY OF THE INVENTION

With the above described conventional fastener member, the protrusions are inserted into holes in a target fastener member and thus positioned, as described above, and therefore if the protrusions are not within a range allowing insertion into the holes, there is a risk that positioning may become more difficult. Hence, there has remained room for improvement in terms of facilitating positioning. Moreover, with recent fastener members, there has been a demand for improved ease-of-use accompanying a further expansion of fields of applicability, for example, which has created a desire in some case for the ability to surely understand the state of coupling, i.e., whether or not coupling has been achieved with the coupling target.

Accordingly, the fastener member according to the present invention can allow easy positioning and sure understanding of the coupling state.

The fastener member according to one aspect of the present invention includes: a base portion having a surface; and a plurality of engaging members vertically provided on the surface, the engaging members being mechanically coupled to a coupling target by engaging the engaging members with the coupling target, the fastener member includes: an arm portion disposed on the base portion via a base connection portion such that a tip side can pivot in a direction so as to approach the surface; a claw portion provided to the arm portion; and a latching portion provided to the base portion, and that latches the claw portion when coupling with the coupling target, wherein the tip side of the arm portion is positioned opposite the surface away from tips of the engaging members when not coupled with the coupling target.

With this aspect of the present invention, when simply approaching the coupling target, the coupling target touches the tip side of the arm portion, and thus the coupling target can be prevented from approaching by the tip side of the arm portion until the engaging members engage. In this state, the fastener member can move freely and in a relative manner to the coupling target, allowing facilitation of positioning. Upon closer approach to the coupling target, the arm portion is pressed against the coupling target, causing the arm portion to pivot in a direction such that the tip side thereof approaches the surface. The engaging members thereby engage the coupling target, causing the fastener member to couple with the coupling target. When this happens, the claw portion is latched by the latching portion, making it possible for this latching to produce a clicking feeling causing the user to know that the fastener member has coupled. Hence, the user can surely understand the coupling state of the fastener member.

With a fastener member according to another aspect of the present invention, the claw portion may be shaped so as to extend and bend in a hook shape from the tip of the arm portion, and the latching portion may be a hook-shaped protrusion that protrudes in a hook shape relative to the surface. Furthermore, with a fastener member according to another aspect, the arm portion includes first and second arm portions which, when seen from the surface, are provided parallel in a predetermined direction oriented such that base ends thereof are adjacent to one another.

Furthermore, with a fastener member according to another aspect of the present invention, the latching portion may abut the claw portion so as to restrict pivoting of the arm portion when not coupled with the coupling target, the face where the latching portion and the claw portion abut having an inclined face inclined relative to the curved face or the surface. Furthermore, with a fastener member according to another aspect, the tip side of the arm portion may have flexibility such as to enable pivoting in a direction so as to be separated away from the surface.

A fastener member according to the present invention can be provided whereby positioning is facilitated and a coupling state can be surely understood.

DETAILED DESCRIPTION

Figure 1:
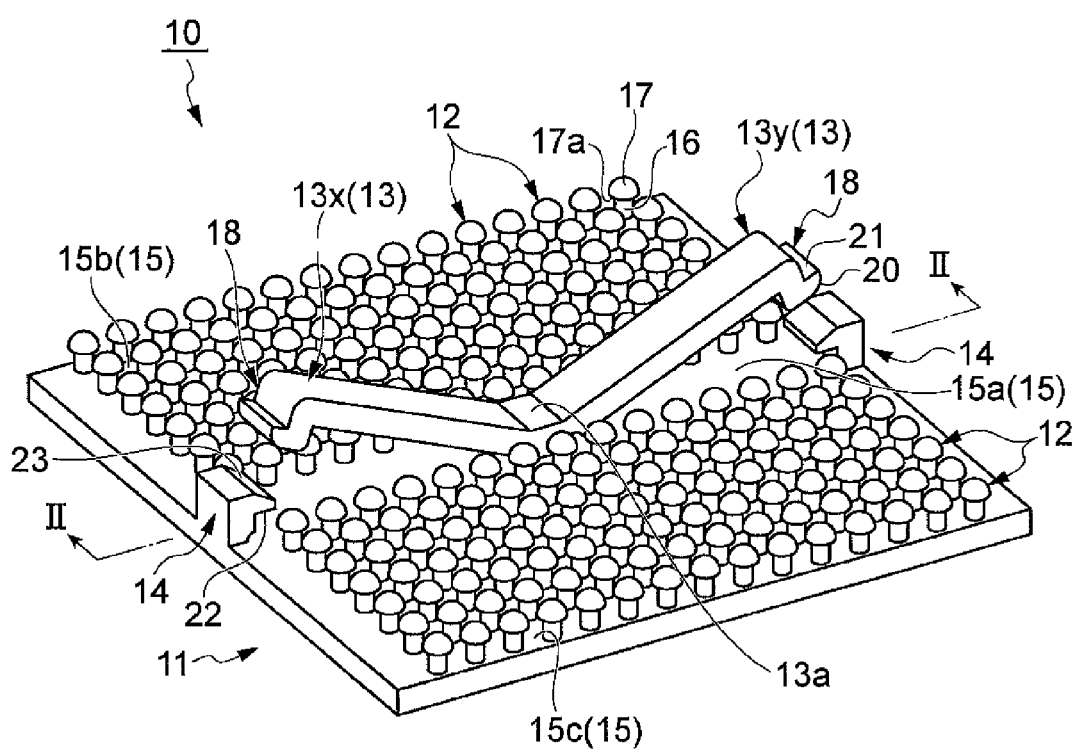
FIG. 1 is a perspective view illustrating a fastener member according to an embodiment.
Figure 1:
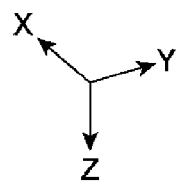

Embodiments of the present invention are described in detail below, with reference to the attached drawings. Note that in the following description, identical or equivalent elements are given the same reference numerals, and redundant descriptions are omitted. Note also that "X-direction," "Y-direction," and "Z-direction" are based on directions relative to the drawings and are for convenience's sake.

FIG. 1 is a perspective view illustrating a fastener member according to an embodiment. FIGS. 2 to 4 are cross-sectional views for describing coupling with the fastener member of FIG. 1. FIGS. 2 to 4 illustrate a cross-section along line II-II in FIG. 1. As illustrated in FIGS. 1 and 2, a fastener member 10 of this embodiment is used to secure an interior panel in a vehicle for example, and constitutes a face-to-face engagement-type face fastener. The fastener member 10 in this case is used as a hook member that mechanically engages a loop member 30, which is a coupling target, by engaging it. Accordingly, a general description is given of the configuration of the fastener member 10 and the loop member 30.

The fastener member 10 corresponds to the male side of the face fastener and is molded as a single unit from a resin material. The fastener member 10 is provided with a base portion 11, a plurality of engaging portions (engaging members) 12 provided in an upright manner to the base portion 11, arm portions 13 disposed on the base portion 11, and hook-shaped protruding portions 14.

The base portion 11 presents a plate-like form and has a main surface (surface) 15 which is substantially flat. The main surface 15 includes a strip-like central region 15a that extends in the Y-direction in the X-direction center, and a first region 15b and a second region 15c which are separated by the central region 15a. This base portion 11 is affixed to an interior panel side member directly or via a bracket, or the like.

The engaging members 12 are aligned in parallel in a lattice form at predetermined intervals upright as viewed in the Z-direction in the first and second regions 15b and 15c on the main surface 15. These engaging members 12 have a rod-shaped shaft portion 16 that is upright having the Z-direction as an axial direction, and an arrowhead portion 17 that acts as a head provided to a tip of the shaft portion 16. The arrowhead portion 17 has a sharp conical exterior shape at the tip side, whereby a latching face 17a for hooking the loop member 30 is formed on the main surface 15 side of the arrowhead portion 17.

The arm portions 13 are provided as a pair to the central region 15a of the base portion 11 and are constituted such that tip sides thereof pivot at least in a direction approaching the main surface 15. These arm portions 13 are disposed on the base portion 11 via a base connection portion 13a. Claw portions 18 are provided to the tips of the arm portions 13. The hook-shaped protrusion portions 14 latch (engage and hold) the claw portions 18 when the fastener member 10 and the loop member 30 are coupled (hereafter simply "during coupling") and are provided in a pair to the central region 15a of the base portion 11.

The loop member 30 corresponds to the female side of the face fastener and has a plurality of loop threads 31 that protrude from a surface 30a. The loop threads 31 engage the engaging portions 12 during coupling and are provided to the surface 30a so as to extend in a loop shape. The loop member 30 is affixed to a member on the chassis of the car, for example, directly or via a bracket or the like.

The arm portions 13 and the hook-shaped protruding portions 14 are described in greater detail.

The arm portions 13 include a first arm portion 13x and a second arm portion 13y. The first arm portion 13x extends from the center of the central region 15a in the Y direction toward a first end side and extends along the Y direction, having a squared cross-section. A base end of the first arm portion 13x is affixed via the base connection portion 13a to the center of the central region 15a.

On the other hand, the tip side of the first arm portion 13x is separated from the main surface 15 beyond the height of protrusion of the engaging portions 12 when the fastener member 10 and the loop member 30 are not coupled (hereafter simply "during non-coupling"). In other words, the first arm portion 13x, during non-coupling, extends such that the tip side thereof is separated away from the main surface 15 toward the tip side, the tip side of the first arm portion 13x is positioned opposite the main surface 15 away from the tips of the engaging portions 12.

The second arm portion 13x extends from the center of the central region in the Y direction toward a second end and extends along the Y direction, having a squared cross-section. A base end of the second arm portion 13y is affixed via the base connection portion 13a to the center of the central region 15a, forming a single unit adjacent to the base end portion of the first arm portion 13x. In other words, the first and second arms 13x and 13y form a single unit, disposed on the base portion 11 via the single base connection portion 13a.

On the other hand, like the first arm portion 13x, the tip side of the second arm portion 13y is separated from the main surface 15 beyond the height of protrusion of the engaging portions 12 during non-coupling. In other words, the second arm portion 13y, during non-coupling, extends such that the tip side thereof so as to be separated away from the main surface 15 toward the tip side, the tip side of the second arm portion 13y is positioned opposite the main surface 15 away from the tips of the engaging portions 12.

The first and second arm portions 13x and 13y thus constituted are provided parallel in the Y direction oriented such that the base end portions thereof are adjacent one another, as viewed in the Z direction. The first and second arm portions 13x and 13y are arranged in parallel so as to expand out in wing-like fashion as viewed in the X direction. The first and second arm portions 13x and 13y can pivot in the X direction in a rotational axis direction due to the elasticity (flexibility) thereof. Note that the main surface 15 side of the base end portions of the first and second arm portions 13x and 13y have notches 19 cut out in an R-shape as viewed in the X direction in order to enhance the flexibility.

Claw portions 18 which engage the hook-shaped protruding portions 14 are provided to the tips of the first and second arm portions 13x and 13y. The claw portions 18 constitute a first side of the clicking mechanism which creates a clicking feeling described below, and have a shape extending in a hook-shaped curve from the tips of the first and second arm portions 13x and 13y. Specifically, the claw portions 18 extend so as to bend 90° to the main surface 15 side from the tips of the first and second arm portions 13x and 13y and then immediately extend so as to bend 90° outward.

The tips of the claw portions 18 are provided so as to be pointed into a beak shape outward. Specifically, the main surface 15 side of the tips of the claw portions 18 has curved faces 20 with rounded corners which abut the hook-shaped protruding portions 14 when the fastener member 10 and the loop member 30 are coupled. On the other hand, the sides opposite the main surface 15 of the tips have latching faces 21 in the direction of extension of the arm portions 13 which latch onto the hook-shaped protruding portions 14 during coupling.

The hook-shaped protruding portions 14 constitute a second side of the clicking mechanism which produces the clicking feeling discussed below and protrude in a hook shape inwardly relative to the main surface 15. The hook-shaped protruding portions 14 are provided in an upright manner to both ends of the central region 15a of the main surface 15 and abut the claw portions 18 of the pivoting arm portions 13.

The tips of the hook-shaped protruding portions 14 are provided so as to be pointed in a beak shape inwardly. Specifically, the main surface 15 side of the tips of the hook-shaped protruding portions 14 has latching faces 22 substantially parallel to the main surface 15 which latch onto the claw portions 18 during coupling. On the other hand, the sides opposite the main surface 15 of the tips have inclined faces 23 which abut the claw portions 18 when the fastener member 10 and the loop member 30 are coupled and are inclined toward the main surface 15 further inward.

The hook-shaped protruding portions 14 thus constituted abut the curved faces 20 of the claw portions 18 with the inclined faces 23 thereof so as to restrict pivoting of the arm portions 13 during non-coupling. Furthermore, the hook-shaped protruding portions 14 are flexible, and therefore temporarily deform so as to bend outwards, allowing release of the pivoting restriction of the arm portions 13. The hook-shaped protruding portions 14 latch onto the claw portions 18 of the arm portions 13 which have pivoted close to the main surface 15 during coupling. Note that notches 24 cut out in an R-shape as viewed in the X-direction are formed on the inside of the base end portions of the hook-shaped protruding portions 14 in order to improve flexibility.

Next, an example is described of mechanically coupling the fastener member 10 to the loop member 30 discussed above.

Figure 2A:
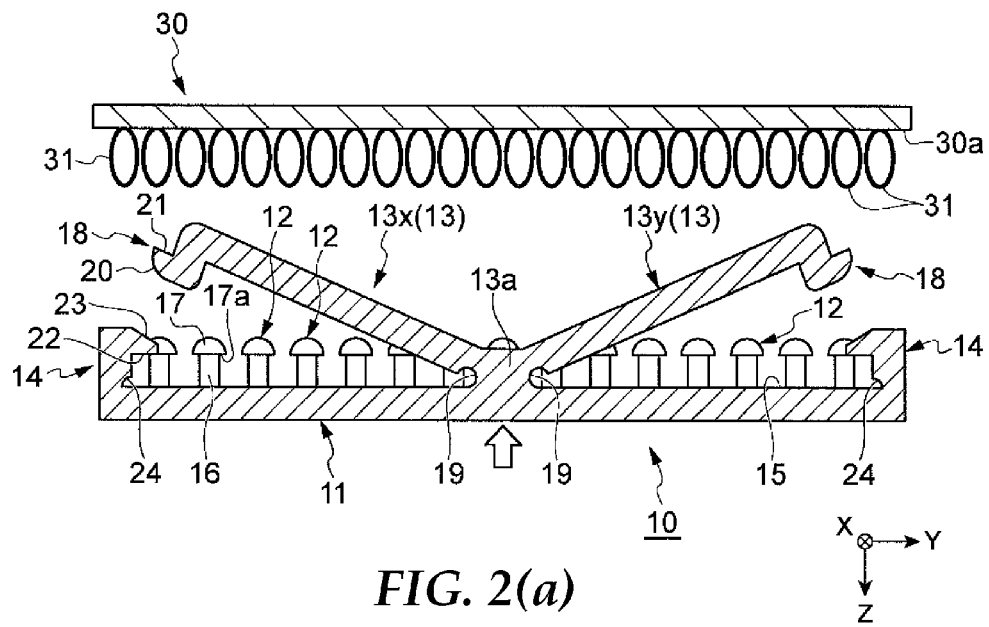
FIG. 2A is a cross-sectional view along line II-II in FIG. 1 for describing coupling by the fastener member of FIG. 1.

As illustrated in FIG. 2A, first, the loop threads 31 of the loop member 30 are caused to confront the engaging portions 12 of the fastener member 10 and these are disposed parallel to one another. The fastener member 10 is in the initial uncoupled state, and therefore the tip sides of the arm portions 13 are separated completely from the main surface 15, the tip sides of the arm portions 13 being positioned opposite the main surface 15 away from the tips of the engaging portions 12.

Figure 2B:
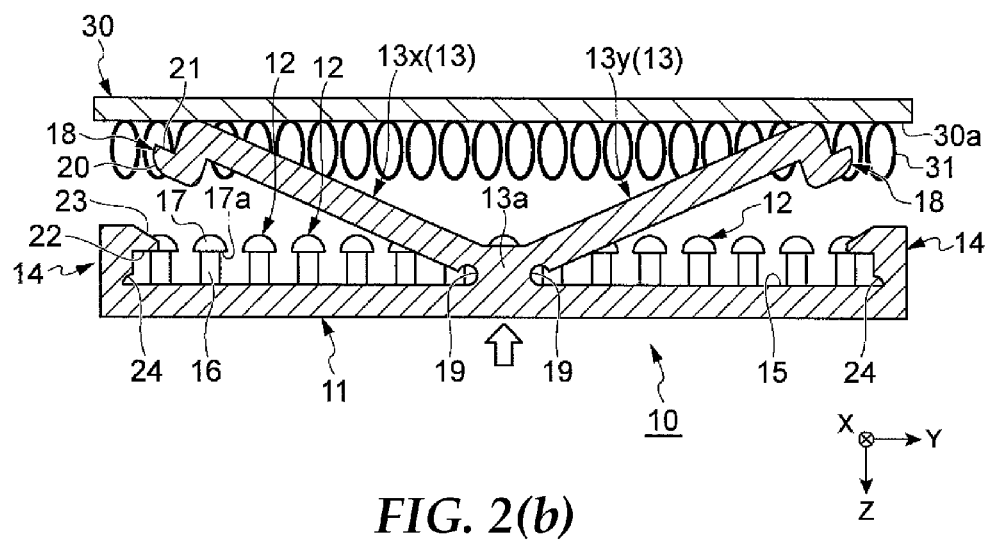
FIG. 2B is a cross-sectional view illustrating a continuation of FIG. 2A.

Next, as illustrated in FIG. 2B, when the fastener member 10 is relatively brought closer to the loop member 30, before the loop threads 31 of the loop member 30 engage the engaging members 12, the tip sides of the arm portions 13 come into contact with the surface 30a of the loop member 30, lightly abutting it. This prevents the loop member 30 from approaching until the engaging portions 12 engage, maintaining the non-coupled state.

In this state (i.e., non-coupling, but with the loop member 30 in contact with the arm portions 13), the relative positions of the fastener member 10 are not yet limited in the X and Y directions, and the fastener member 10 can move relatively in the X and Y directions. Therefore, the fastener member 10 can be moved in the X and Y directions relative to the loop member 30 in order to position the fastener member 10 (positioning).

Figure 3A:
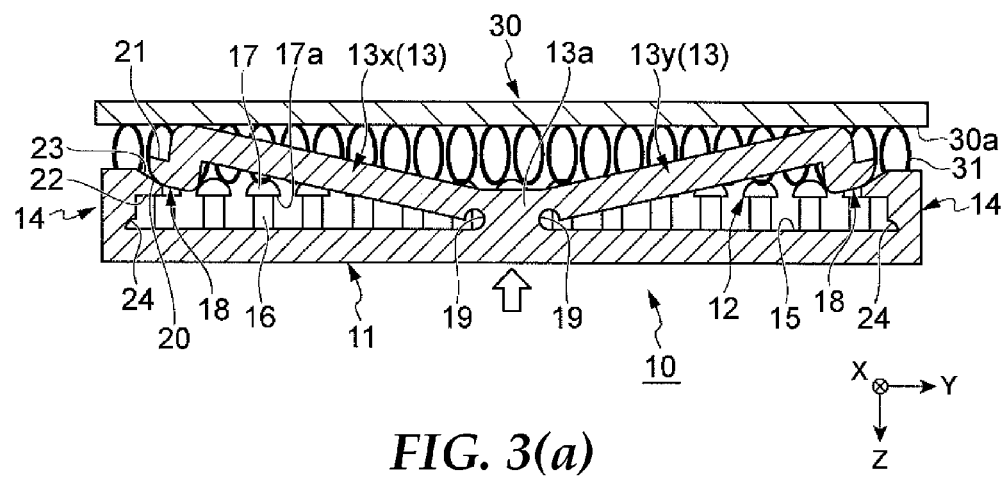
FIG. 3A is a cross-sectional view illustrating a continuation of FIG. 2B.
Figure 4:
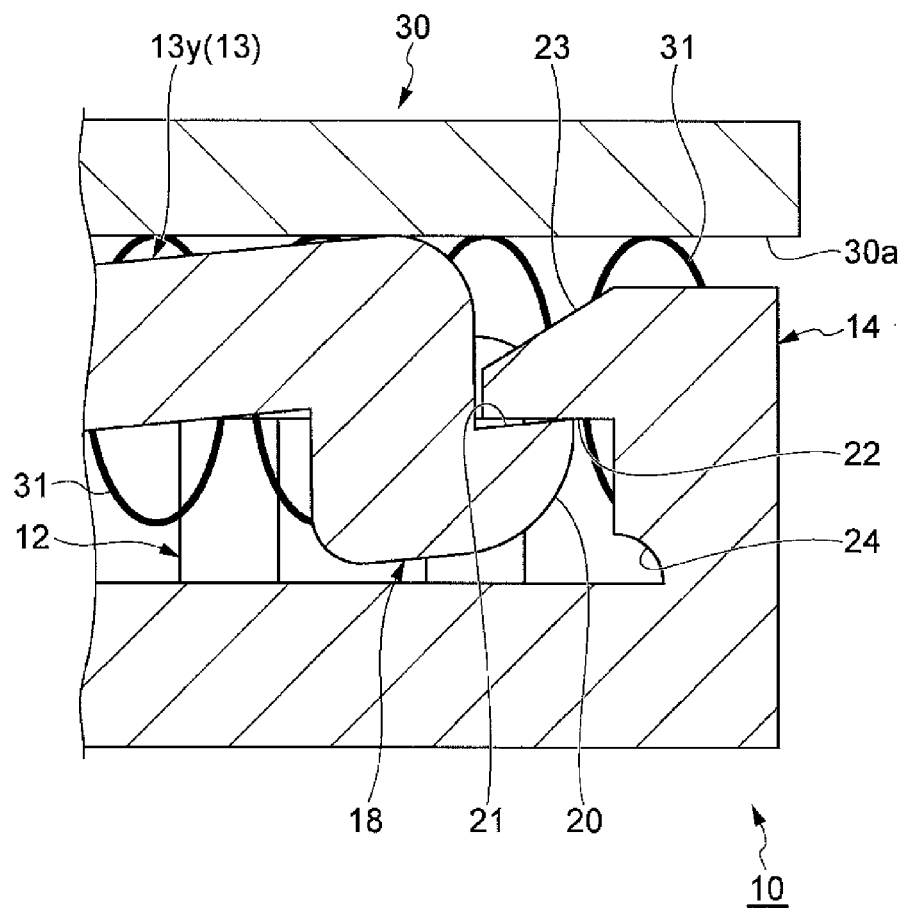
FIG. 4 is a cross-sectional view illustrating a portion of FIG. 3B enlarged.

Next, as illustrated in FIG. 3A, the fastener member 10 is brought even closer to the loop member 30, the tip sides of the arm portions 13 abut the loop member 30 and are pressed against the main surface 15. When the arm portions 13 are pivoted toward the main surface 15 side until the curved faces 20 of the claw portions 18 abut the inclined faces 23 of the hook-shaped protruding portions 14, further pivoting of the arm portions 13 (i.e., closer approach by the fastener member 10) is restricted.

Figure 3B:
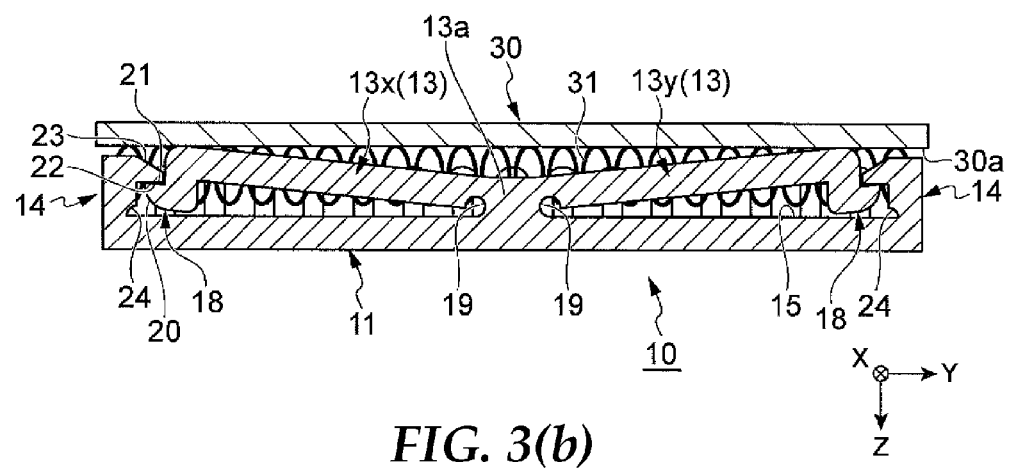
FIG. 3B is a cross-sectional view illustrating a continuation of FIG. 3A.

When this happens, if the fastener member 10 is pressed with a predetermined amount or more of pressure toward the loop member 30, the hook-shaped protruding portions 14 flex temporarily outward, the claw portions 18 move past the inclined faces 23 and the pivot restriction of the arm portions 13 is temporarily released. Next, as illustrated in FIG. 3B, the arm portions 13 are pivoted until the tip sides of the arm portions 13 are positioned closer to the main surface 15 side than the tips of the engaging portions 12. When this happens, the fastener member 10 comes even closer to the loop member 30, and therefore the latching faces 17a of the engaging portions 12 hook onto and engage the loop threads 31. As a result, the fastener member 10 and the loop member 30 engage are linked together, thereby being mechanically coupled (joined) and detachably secured.

When this coupling occurs, as illustrated in FIG. 4, the engagement of the engaging members 12 occurs simultaneously as the claw portions 18 latch onto the hook-shaped protruding portions 14 by the latching faces 21 and 22. The clicking feeling is created by this latching, which announces to the user the coupling of the fastener member 10. Incidentally, this clicking feeling causes the user to sense the coupling of the fastener member 10, and is at least either a sound (aural stimulus) or a feeling (tactile stimulus) that occurs the instant the claw portions 18 latch onto the hook-shaped protruding portions 14.

Thus, when the fastener member 10 according to this embodiment is simply overlaid onto the loop member 30, the tip sides of the arm portions 13 prevent the coupling target from approaching until the engaging portions 12 engage, allowing free and relative movement in the X and Y directions of the fastener member 10. Thus, positioning is made easier. Moreover, when the fastener member 10 is brought yet closer to the loop member 30, the engaging portions 12 engage the loop member 30 and couple therewith, while at the same time the claw portions 18 are caused to engage the hook-shaped protruding portions 14, creating a clicking feeling. Hence, it is possible to surely understand a coupling state of the fastener member 10.

In other words, with this embodiment, when coupling the fastener member 10, positioning is made possible with a high degree of freedom, while suppressing easy coupling in an unintended position. In addition, a clicking feeling can be caused to occur simultaneously with coupling, making it possible to notify the user of said coupling. Accordingly, positioning can be facilitated and the coupling state can be surely understood.

Furthermore, with this embodiment, as described above, the claw portions 18 are shaped so as to extend in a hook-like bent shape from the tips of the arm portions 13, and the claw portions 18 latch onto the hook-shaped protruding portions 14 which protrude out in a hook-shape toward the main surface 15. The action and effect are thereby realized concretely, i.e., the effect of facilitating positioning and sure understanding the coupling state.

Furthermore, with this embodiment, as described above, the arm portions 13 include the first and second arm portions 13x and 13y. These first and second arm portions 13x and 13y are arranged in parallel along the Y direction (a predetermined direction) with the base end portions thereof oriented so as to be adjacent to one another as viewed in the Z direction. Hence, the pressure needed during coupling is balanced in the fastener member 10.

Furthermore, with this embodiment, as described above, when the fastener member 10 is pressed with less pressure than the predetermined amount of pressure, pivoting of the arm portions 13 is restricted by the claw portions 18 abutting the hook-shaped protruding portions 14, and engagement of the engaging portions 12 is prevented. On the other hand, if the fastener member 10 is pressed with greater pressure than the predetermined amount of pressure, the claw portions 18 move along the inclined faces 23 and the arm portions 13 pivot down toward the main surface 15 side, causing the engaging portions 12 to engage the loop member 30. Hence, coupling of the fastener member 10 can be easily realized using varying amounts of pressure.

Furthermore, the arm portions 13 of this embodiment, as described above, can pivot with the X direction as the rotational axis direction, having flexibility for the tip sides to pivot toward the main surface 15, in addition to flexibility for the tip sides to pivot in a direction so as to be separated away from the main surface 15. The arm portions 13 thereby pivot to the side opposite the main surface 15 and returns to their initial state after the fastener member 10 is removed from the loop member 30, the tip sides of the arm portions 13 being repositioned to the side opposite the main surface 15 away from the tips of the engaging portions 12. Hence, the fastener 10 can be repeatedly reused.

Note that with this embodiment, the excessive pressure accompanying destruction of members is not needed when coupling the fastener member 10 and the loop member 30, making it possible to say that the fastener member 10 can be coupled easily. Moreover, because the fastener member 10 can be extrusion molded as a single unit, manufacturing can be made easier. Furthermore, machining of the loop member 30, which is the coupling target, is unnecessary with this embodiment. Also, the pressure needed for coupling can be adjusted easily by appropriately adjusting the flexibility of the arm portions 13.

A favorable embodiment of the present invention was described above. However, the present invention is not limited to the above embodiment, and can be modified within a scope not departing from the gist described in the claims, and may be applied to other embodiments.

For example, in the above embodiment, the fastener member 10 is for use in an automotive interior, but uses of the fastener member 10 are not limited to this. The fastener member 10 can be applied to coupling in various fields, e.g., securing other members of seats in cars, securing building materials, securing mats, securing the upholstery of chairs, securing curtains, securing displays such as display panels, securing supporters, and securing home health care devices.

Furthermore, the fastener member 10 of the above embodiment is coupled to the loop member 30 as a coupling target, but the coupling target is not limited to this. The coupling target of the fastener member 10 may be a different loop member from the loop member 30, for example, or may be a hook member having a similar structure to the fastener member 10.

Furthermore, in the above embodiment, the arm portions 13 were provided as a pair, but the number of arm portions 13 provided is not limited to this, and may be one or three or more. For example, as illustrated in FIG. 5A, a fastener member 110 provided with one arm portion 13 is also possible, as is a fastener member 210 which is provided with four arm portions 13, as illustrated in FIG. 5B.

Figure 5A:
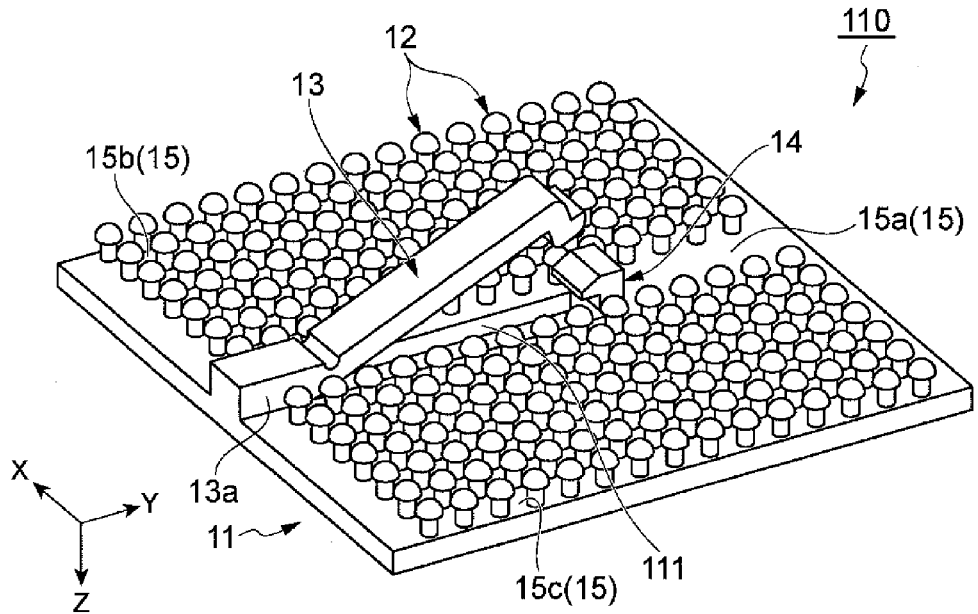
FIG. 5A is a perspective view illustrating a fastener member according to a modified example.

With the fastener member 110 illustrated in FIG. 5A, the arm portion 13 extends in the Y direction from a first end of the central region 15a in the Y direction toward the central portion. The hook-shaped protruding portions 14 are provided toward a second end of the central portion of the central region 15a in the Y direction.

Note that, as illustrated in the drawings, through holes 111 are formed directly below where the arm portion 13 pivots in the base portion 11. Using these through holes 111 makes it possible to use extrusion molding that matches top and bottom molds when molding the arm portions 13, making obtaining the fastener member 110 easy. Incidentally, through holes similar to the through holes 111 may naturally be applied to above embodiments.

Figure 5B:
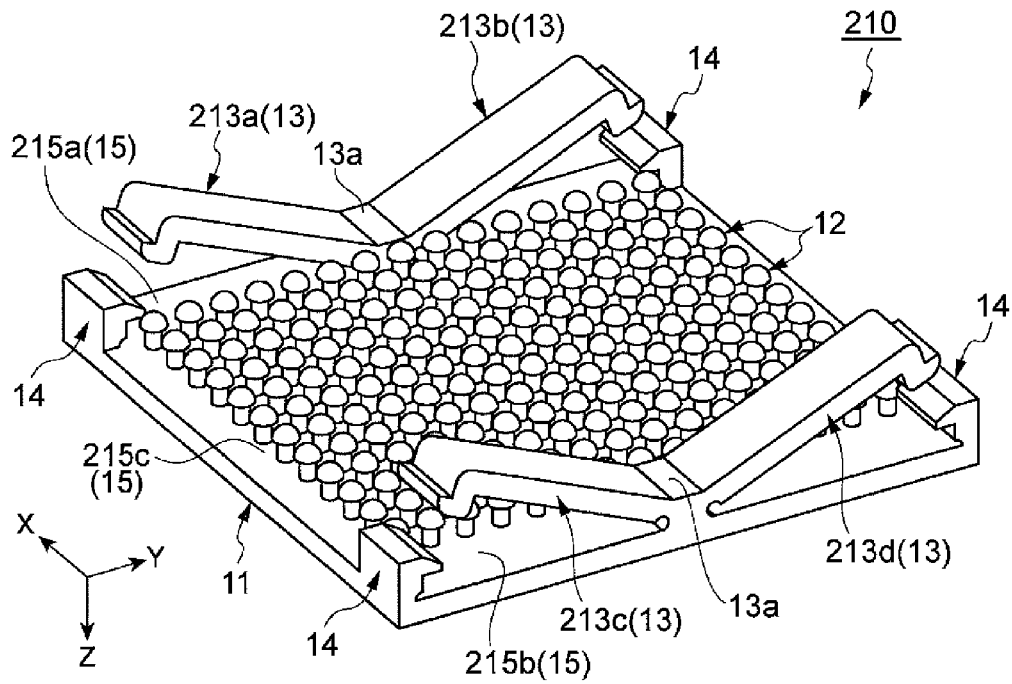
FIG. 5B is a perspective view illustrating a fastener member according to another modified example.

With the fastener member 210 illustrated in FIG. 5B, the main surface 15 includes strip-like end regions 215a and 215b which extend in the Y direction at both X direction ends and a main region 215c between the end regions 215a and 215b. The engaging portions 12 are concentrated in the main region 215. The arm portions 13 include first through fourth arms 213a to 213d. The first and second arms 213a and 213b are provided like the first and second arm portions 13x and 13y in the end region 215a, and the third and fourth arms 213c and 213d are provided like the first and second arm portions 13x and 13y in the end region 215b.

Moreover, in the above embodiment, the fastener member 10 was formed as a single unit, but it may be formed as separate units. For example, the fastener member may be constituted by a separate member in which a plurality of the engaging portions 12 are provided and a member having the arm portions 13.

Furthermore, in this embodiment, the claw portions 18 which extend bending in a hook shape from the tips of the arm portions 13 were provided, but this is not a limitation. It is sufficient that the claw portions are provided to the arm portions 13. Moreover, with the above embodiment, the hook-shaped protruding portions 14 were provided as latching portions, but this is not a limitation. It is sufficient that the latching portions latch onto the claw portions 18 during coupling.

Alternately, this embodiment is provided with the plate-like base portion 11, but various other shapes can be used for the base portion 11.

The position of the arm portions 13 is not a limitation. It is possible to provide them to the main surface 15 of the base portion 11 as in the above embodiment, and it is also possible to provide them to side faces of the base portion 11, for example. What is important is that the arm portions 13 be disposed to the base portion 11 via the base connection portion 13a. Furthermore, the above embodiment has the curved faces 20 and the inclined faces 23 as abutting faces, but it is also possible to have only either one. Note that, in the above embodiment, the X direction corresponds to one direction along the main surface 15, the Y direction corresponds to a direction along the main surface 15 and orthogonal to the X direction, and the Z direction corresponds to a direction orthogonal to both the X direction and the Y direction.

What is claimed is:

1. A fastener member comprising:
   a base portion having a surface; and a plurality of engaging members vertically provided on the surface, the engaging members being mechanically coupled to a coupling target by engaging the engaging members with the coupling target;
   an arm portion disposed on the base portion via a base connection portion such that a tip side can pivot in a direction so as to approach the surface;
   a claw portion provided on the arm portion; and a latching portion provided on the base portion that engages the claw portion when the coupling target is coupled, the tip side of the arm portion being positioned to a side opposite the surface away from tips of the engaging members when the coupling target is not coupled.

2. The fastener member according to claim 1, wherein the claw portion has a shape that extends so as to bend in a hook shape from the tip of the arm portion, and the latching portion is a hook-shaped protrusion that protrudes in a hook shape relative to the surface.

3. The fastener member according to claim 2, wherein the arm portion includes first and second arm portions, and the first and second arm portions are arranged in parallel along a predetermined direction with the base portions of the first and second arm portions oriented so as to be adjacent to each other when viewed from the surface.

4. The fastener member according to claim 2, wherein the latching portion abuts the claw portion so as to restrict pivoting of the arm portion when not coupled with the coupling target, and an abutting face between the latching portion and the claw portion has a curved face or an inclined face that inclines relative to the surface.

5. The fastener member according to claim 2, wherein the tip side of the arm portion has flexibility such as to enable pivoting in a direction so as to be separated away from the surface.

6. The fastener member according to claim 1, wherein the arm portion includes first and second arm portions, and the first and second arm portions are arranged in parallel along a predetermined direction with the base portions of the first and second arm portions oriented so as to be adjacent to each other when viewed from the surface.

7. The fastener member according to claim 6, wherein the latching portion abuts the claw portion so as to restrict pivoting of the arm portion when not coupled with the coupling target, and an abutting face between the latching portion and the claw portion has a curved face or an inclined face that inclines relative to the surface.

8. The fastener member according to claim 6, wherein the tip side of the arm portion has flexibility such as to enable pivoting in a direction so as to be separated away from the surface.

9. The fastener member according to claim 1, wherein the latching portion abuts the claw portion so as to restrict pivoting of the arm portion when not coupled with the coupling target, and an abutting face between the latching portion and the claw portion has a curved face or an inclined face that inclines relative to the surface.

10. The fastener member according to claim 9, wherein the tip side of the arm portion has flexibility such as to enable pivoting in a direction so as to be separated away from the surface.

11. The fastener member according to claim 1, wherein the tip side of the arm portion has flexibility such as to enable pivoting in a direction so as to be separated away from the surface.

12. The fastener member according to claim 1, wherein a clicking feeling is produced, when the claw portion is latched by the latching portion.

* * * * *